(12) United States Patent
Collopy

(10) Patent No.: US 11,821,369 B2
(45) Date of Patent: Nov. 21, 2023

(54) ELECTRIC POWER ASSIST FOR IN-FLIGHT ENGINE RE-START

(71) Applicant: RTX Corporation, Farmington, CT (US)

(72) Inventor: Gary Collopy, Vernon, CT (US)

(73) Assignee: RTX CORPORATION, Farmington, CT (US)

(*) Notice: Subject to any disclaimer, the term of this patent is extended or adjusted under 35 U.S.C. 154(b) by 0 days.

(21) Appl. No.: 16/991,143

(22) Filed: Aug. 12, 2020

(65) Prior Publication Data
US 2021/0115857 A1    Apr. 22, 2021

Related U.S. Application Data

(60) Provisional application No. 62/885,773, filed on Aug. 12, 2019.

(51) Int. Cl.
*F02C 7/262* (2006.01)
*F02C 6/20* (2006.01)
(Continued)

(52) U.S. Cl.
CPC .............. *F02C 7/262* (2013.01); *F02C 6/20* (2013.01); *F02C 7/268* (2013.01);
(Continued)

(58) Field of Classification Search
None
See application file for complete search history.

(56) References Cited

U.S. PATENT DOCUMENTS 5,125,597 A * 6/1992 Coffinberry .............. F02C 7/32
454/71
7,513,119 B2   4/2009 Zielinski et al.
(Continued)

FOREIGN PATENT DOCUMENTS

EP     1050672 A2    11/2000
EP     3415436 A1 *  12/2018 ............. F01D 15/10
(Continued)

OTHER PUBLICATIONS

R.C. Wibbelsman, Cold WeatherJet Engine Starting Strategies Made Possible by Engine Digital Control Systems, May 1991, Agard, Agard Conference Proceedings 480, p. 10-3. (Year: 1991).*
(Continued)

*Primary Examiner* — Todd E Manahan
*Assistant Examiner* — Marc J Amar
(74) *Attorney, Agent, or Firm* — CANTOR COLBURN LLP

(57) ABSTRACT

A hybrid electric propulsion system including: a gas turbine engine comprising a low speed spool and a high speed spool, the low speed spool comprising a low pressure compressor and a low pressure turbine, and the high speed spool comprising a high pressure compressor and a high pressure turbine; an electric motor configured to augment rotational power of the high speed spool or the low speed spool; and a controller to: detect an in-flight windmill re-start condition of the gas turbine engine; and cause power to be supplied from a power source to the electric motor in order to augment rotational power of the high speed or the low speed spool during the detected in-flight windmill re-start condition.

15 Claims, 5 Drawing Sheets

(51) Int. Cl.
*F02C 7/268* (2006.01)
*B64D 27/02* (2006.01)

(52) U.S. Cl.
CPC .. *B64D 2027/026* (2013.01); *F05D 2220/323* (2013.01); *F05D 2260/85* (2013.01); *F05D 2270/091* (2013.01); *F05D 2270/101* (2013.01)

(56) References Cited

U.S. PATENT DOCUMENTS

| | | | |
|---|---|---|---|
| 7,802,757 | B2 | 9/2010 | Dooley et al. |
| 8,218,341 | B2 | 7/2012 | Wiegman et al. |
| 8,857,191 | B2 | 10/2014 | Hyde et al. |
| 10,094,293 | B2 | 10/2018 | Perkinson et al. |
| 10,641,179 | B2 * | 5/2020 | Hayama ............ F02C 7/26 |
| 2006/0168968 | A1 * | 8/2006 | Zielinski ............ F02C 7/277 |
| | | | 60/778 |
| 2006/0260323 | A1 * | 11/2006 | Moulebhar ............ F02C 6/08 |
| | | | 60/793 |
| 2007/0267540 | A1 | 11/2007 | Atkey et al. |
| 2012/0167590 | A1 * | 7/2012 | Bettner ............ F02C 7/275 |
| | | | 60/786 |
| 2016/0138475 | A1 * | 5/2016 | Hield ............ F02C 9/22 |
| | | | 60/778 |
| 2017/0022907 | A1 * | 1/2017 | Argote ............ F02C 9/28 |
| 2017/0342908 | A1 * | 11/2017 | Hon ............ F01D 25/34 |
| 2020/0025066 | A1 * | 1/2020 | Husband ............ F02C 9/18 |
| 2020/0173369 | A1 * | 6/2020 | Husband ............ F02C 7/26 |

FOREIGN PATENT DOCUMENTS

| | | | |
|---|---|---|---|
| EP | 3415436 A1 | 12/2018 | |
| EP | 3663535 A1 | 6/2020 | |
| FR | 3056558 A1 * | 3/2018 | ............ B64D 31/14 |
| FR | 3056558 A1 | 3/2018 | |

OTHER PUBLICATIONS

European Search Report for Application No. EP 20 19 0770; dated Feb. 3, 2021.

European Office Action for EP Application No. 20190770.6; dated Aug. 31, 2022, (5 pages).

* cited by examiner

ELECTRIC POWER ASSIST FOR IN-FLIGHT ENGINE RE-START

CROSS-REFERENCE TO RELATED APPLICATIONS

This application claims priority to U.S. Provisional Application Ser. No. 62/885,773 filed on Aug. 12, 2019 the contents of which are incorporated herein by reference thereto.

BACKGROUND

The subject matter disclosed herein generally relates to in-flight engine re-start of an aircraft engine and, more particularly, to a method and an apparatus for control for hybrid electric engine and/or an engine with electric power assist for in-flight re-start.

After an engine shutdown during flight, the engine is required to re-start within a "windmill" re-start envelope, that is defined by a range of altitude and airspeed where the engine must re-start with no external power source (APU or opposite engine cross-bleed). This may also be referred to as in-flight windmill re-start envelope.

Accordingly, it is desirable to provide an aircraft engine with an in-flight windmill re-start envelope that includes broader airspeed boundaries and higher altitude boundaries.

BRIEF DESCRIPTION

According to one embodiment, a hybrid electric propulsion system including: a gas turbine engine comprising a low speed spool and a high speed spool, the low speed spool comprising a low pressure compressor and a low pressure turbine, and the high speed spool comprising a high pressure compressor and a high pressure turbine; an electric motor configured to augment rotational power of the high speed spool; and a controller operable to: supply power from a power source to the electric motor to expand an in-flight windmill re-start envelope to include airspeeds and altitudes that would be excluded from an in-flight windmill re-start envelope that does not rely upon augmented rotational power to the high speed spool, and wherein the controller has full authority of the power source and the electric motor.

In addition to one or more of the features described above or below, or as an alternative, the controller and the electric motor provide compressor stability to the high pressure compressor during the detected in-flight windmill re-start such that high pressure compressor bleed valves are not required.

In addition to one or more of the features described above or below, or as an alternative, the controller may be a full authority digital engine control (FADEC) that has full authority over the power source and the electric motor.

A technical effect of the apparatus, systems and methods is achieved by providing electric power to the high speed spool of the hybrid electric propulsion system in order to expand an in-flight windmill re-start envelope to include airspeeds and altitudes that would be excluded from an in-flight windmill re-start envelope that does not rely upon augmented rotational power to the high speed spool, wherein the controller has full authority of the power source and the electric motor.

Disclosed is a hybrid electric propulsion system including: a gas turbine engine comprising a low speed spool and a high speed spool, the low speed spool comprising a low pressure compressor and a low pressure turbine, and the high speed spool comprising a high pressure compressor and a high pressure turbine; an electric motor configured to augment rotational power of the high speed spool or the low speed spool; and a controller operable to: detect an in-flight windmill re-start condition of the gas turbine engine; and cause power to be supplied from a power source to the electric motor in order to augment rotational power of the high speed or the low speed spool during the detected in-flight windmill re-start condition.

In addition to one or more of the features described above, or as an alternative to any of the foregoing embodiments, the controller is a full authority digital engine control (FADEC).

In addition to one or more of the features described above, or as an alternative to any of the foregoing embodiments, the controller and the electric motor provide compressor stability to the high pressure compressor during the detected in-flight windmill re-start condition such that high pressure compressor bleed valves are not required.

In addition to one or more of the features described above, or as an alternative to any of the foregoing embodiments, the controller is a full authority digital engine control (FADEC) that has full authority over the power source and the electric motor.

In addition to one or more of the features described above, or as an alternative to any of the foregoing embodiments, the power source is at least one of the following: a battery; a super capacitor; and an ultra capacitor.

In addition to one or more of the features described above, or as an alternative to any of the foregoing embodiments, the motor is connected to an engine accessory gearbox that is operably coupled to the high speed spool.

In addition to one or more of the features described above, or as an alternative to any of the foregoing embodiments, the motor is connected to an engine accessory gearbox that is operably coupled to the high speed spool.

In addition to one or more of the features described above, or as an alternative to any of the foregoing embodiments, the motor is connected to an engine accessory gearbox that is operably coupled to the high speed spool.

In addition to one or more of the features described above, or as an alternative to any of the foregoing embodiments, the motor is configured to only augment rotational power of the high speed spool during the detected in-flight windmill re-start condition of the gas turbine engine.

In addition to one or more of the features described above, or as an alternative to any of the foregoing embodiments, the motor is configured to only augment rotational power of the high speed spool during the detected in-flight windmill re-start condition of the gas turbine engine.

In addition to one or more of the features described above, or as an alternative to any of the foregoing embodiments, the motor is configured to only augment rotational power of the high speed spool during the detected in-flight windmill re-start condition of the gas turbine engine.

Also disclosed is a method for stabilizing a compressor section of a gas turbine engine during an in-flight re-start of the gas turbine engine, the method including the steps of: providing power assist to a high speed spool of the gas turbine engine via an electric motor operably coupled to the high speed spool during the in-flight re-start of the gas turbine engine.

In addition to one or more of the features described above, or as an alternative to any of the foregoing embodiments, the in-flight re-start of the gas turbine engine is autonomous.

In addition to one or more of the features described above, or as an alternative to any of the foregoing embodiments, the method further includes the step of supplying power from a power source to the electric motor, wherein a controller has full authority of the power source and the electric motor.

In addition to one or more of the features described above, or as an alternative to any of the foregoing embodiments, the controller and the electric motor provide compressor stability to a high pressure compressor of the high speed spool during the in-flight re-start such that high pressure compressor bleed valves are not required for the in-flight re-start.

In addition to one or more of the features described above, or as an alternative to any of the foregoing embodiments, the controller is a full authority digital engine control (FADEC).

In addition to one or more of the features described above, or as an alternative to any of the foregoing embodiments, the power source is at least one of the following: a battery; a super capacitor; and an ultra capacitor.

In addition to one or more of the features described above, or as an alternative to any of the foregoing embodiments, the in-flight re-start of the gas turbine engine is autonomous.

In addition to one or more of the features described above, or as an alternative to any of the foregoing embodiments, the controller is a full authority digital engine control (FADEC).

In addition to one or more of the features described above, or as an alternative to any of the foregoing embodiments, the controller and the electric motor provide compressor stability to a high pressure compressor of the high speed spool during the in-flight re-start such that high pressure compressor bleed valves are not required for the in-flight re-start.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
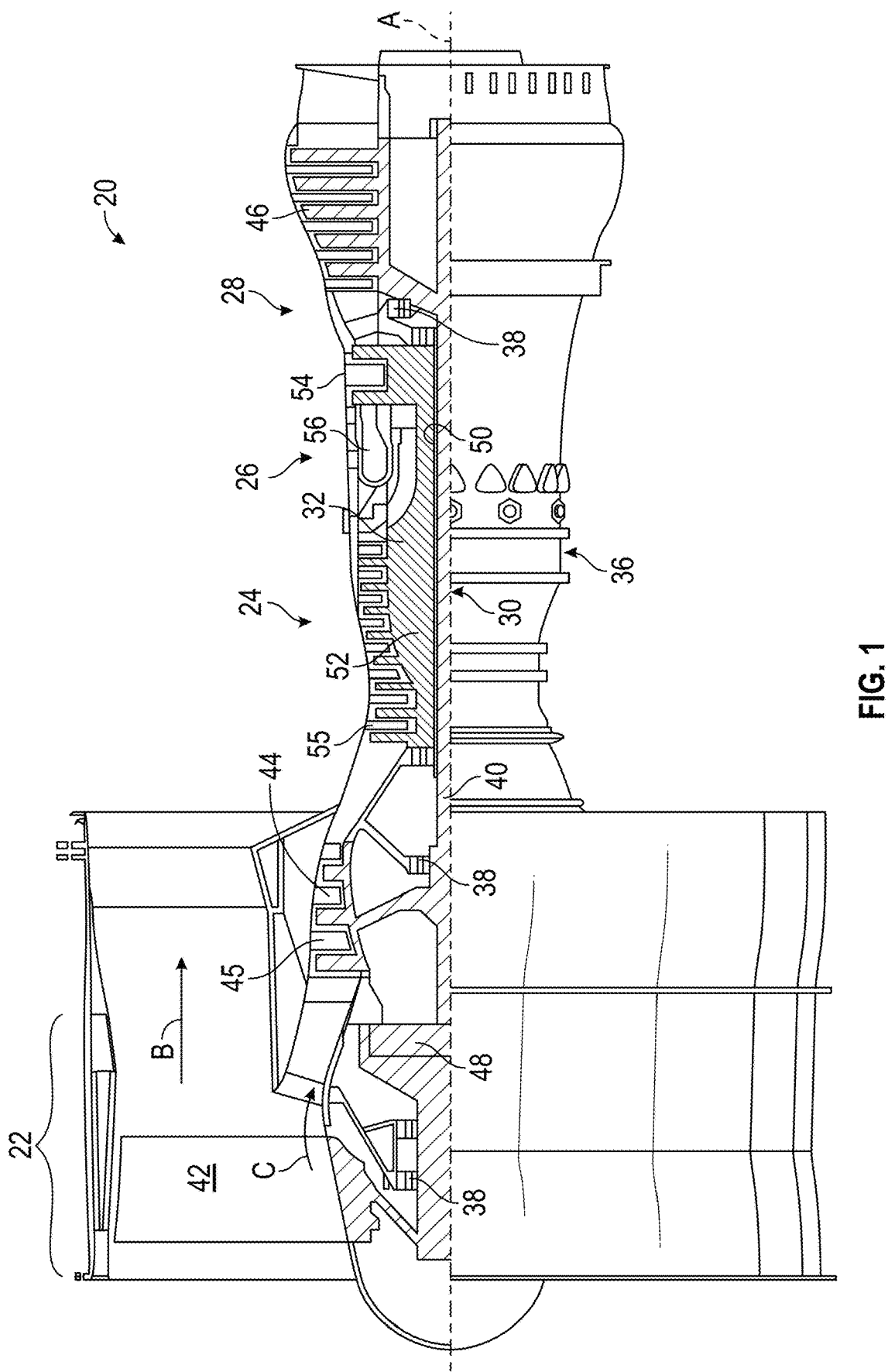
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. In some embodiments, stator vanes 45 in the low pressure compressor 44 and stator vanes 55 in the high pressure compressor 52 may be adjustable during operation of the gas turbine engine 20 to support various operating conditions. In other embodiments, the stator vanes 45, 55 may be held in a fixed position. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150 ft/second (350.5 m/sec).

While the example of FIG. 1 illustrates one example of the gas turbine engine 20, it will be understood that any number of spools, inclusion or omission of the gear system 48, and/or other elements and subsystems are contemplated. Further, rotor systems described herein can be used in a variety of applications and need not be limited to gas turbine engines for aircraft applications. For example, rotor systems can be included in power generation systems, which may be ground-based as a fixed position or mobile system, and other such applications.

Figure 2:
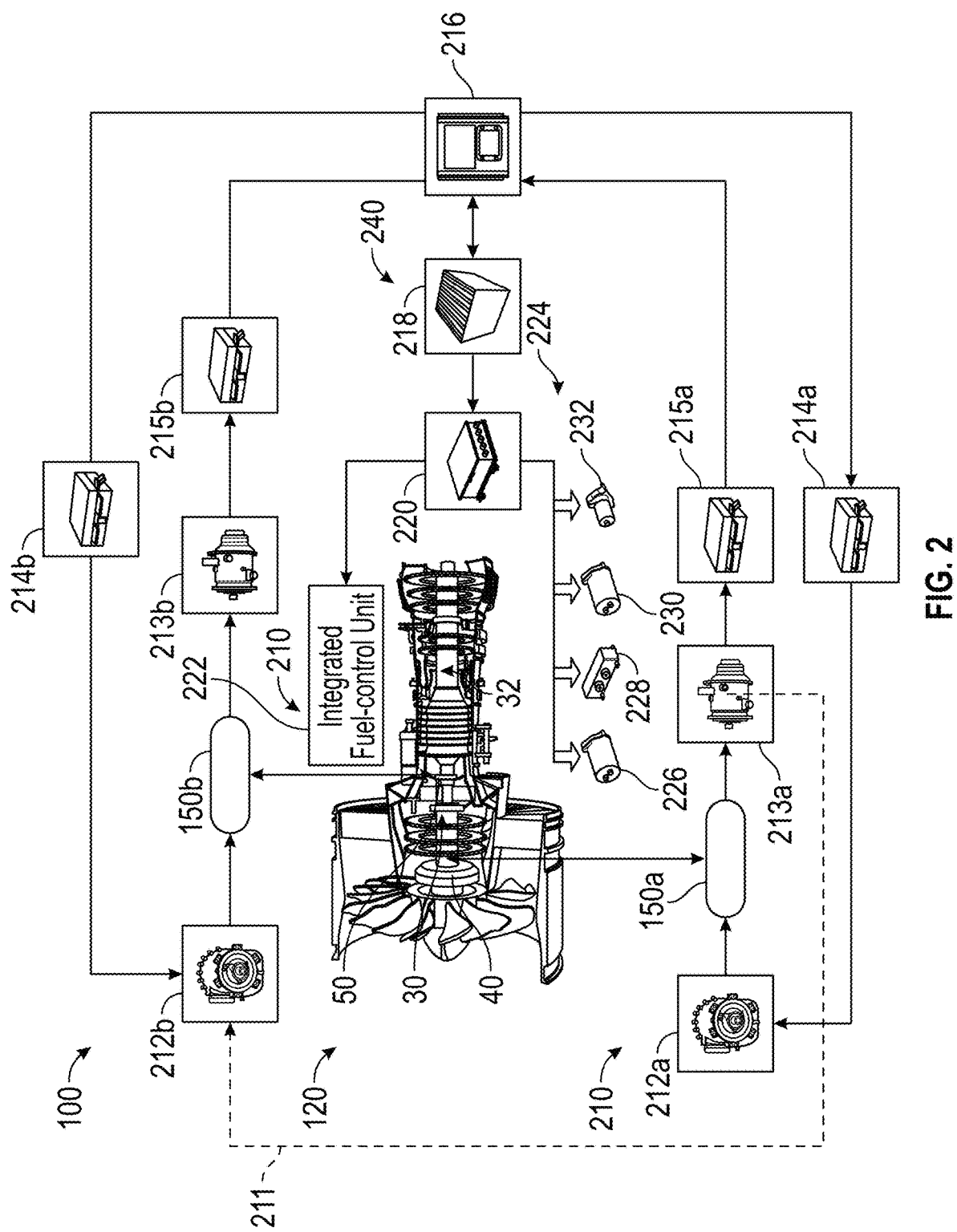
FIG. 2 is a schematic diagram of a hybrid electric propulsion system with physical power flow connections (electrical and mechanical power), in accordance with an embodiment of the disclosure.

FIG. 2 illustrates a hybrid electric propulsion system 100 (also referred to as hybrid gas turbine engine 100) including a gas turbine engine 120 operably coupled to an electrical power system 210 as part of a hybrid electric aircraft. One or more mechanical power transmissions 150 (e.g., 150A, 150B) can be operably coupled between the gas turbine engine 120 and the electrical power system 210. The gas turbine engine 120 can be an embodiment of the gas turbine engine 20 of FIG. 1 and includes one or more spools, such as low speed spool 30 and high speed spool 32, each with at least one compressor section and at least one turbine section operably coupled to a shaft (e.g., low pressure compressor 44 and low pressure turbine 46 coupled to inner shaft 40 and high pressure compressor 52 and high pressure turbine 54 coupled to outer shaft 50 as depicted in FIG. 1). The electrical power system 210 can include a first electric motor 212A configured to augment rotational power of the low speed spool 30 and a second electric motor 212B configured to augment rotational power of the high speed spool 32. Although two electric motors 212A, 212B are depicted in FIG. 2, it will be understood that there may be only a single electric motor (e.g., only electric motor 212B for rotation of the high speed spool as discussed below) or additional electric motors (not depicted). The electrical power system 210 can also include a first electric generator 213A configured to convert rotational power of the low speed spool 30 to electric power and a second electric generator 213B configured to convert rotational power of the high speed spool 32 to electric power. Although two electric generators 213A, 213B are depicted in FIG. 2, it will be understood that there may be only a single electric generator (e.g., only electric generator 213A) or additional electric generators (not depicted). In some embodiments, one or more of the electric motors 212A, 212B can be configured as a motor or a generator depending upon an operational mode or system configuration, and thus one or more of the electric generators 213A, 213B may be omitted.

In the example of FIG. 2, the mechanical power transmission 150A includes a gearbox operably coupled between the inner shaft 40 and a combination of the first electric motor 212A and first electric generator 213A. The mechanical power transmission 150B can include a gearbox operably coupled between the outer shaft 50 and a combination of the second electric motor 212B and second electric generator 213B. In embodiments where the electric motors 212A, 212B are configurable between a motor and generator mode of operation, the mechanical power transmission 150A, 150B can include a clutch or other interfacing element(s).

The electrical power system 210 can also include motor drive electronics 214A, 214B operable to condition current to the electric motors 212A, 212B (e.g., DC-to-AC converters). The electrical power system 210 can also include rectifier electronics 215A, 215B operable to condition current from the electric generators 213A, 213B (e.g., AC-to-DC converters). The motor drive electronics 214A, 214B and rectifier electronics 215A, 215B can interface with an energy storage management system 216 that further interfaces with an energy storage system 218. The energy storage management system 216 can be a bi-directional DC-DC converter that regulates voltages between energy storage system 218 and electronics 214A, 214B, 215A, 215B. The energy storage system 218 can include one or more energy storage devices, such as a battery, a super capacitor, an ultra capacitor, and the like. The energy storage management system 216 can facilitate various power transfers within the hybrid electric propulsion system 100. For example, power from the first electric generator 213A can be transferred 211 to the second electric motor 212B as a low speed spool 30 to high speed spool 32 power transfer. Other examples of power transfers may include a power transfer from the second electric generator 213B to the first electric motor 212A as a high speed spool 32 to low speed spool 30 power transfer.

A power conditioning unit 220 and/or other components can be powered by the energy storage system 218. The power conditioning unit 220 can distribute electric power to support actuation and other functions of the gas turbine engine 120. For example, the power conditioning unit 220 can power an integrated fuel control unit 222 to control fuel flow to the gas turbine engine 120. The power conditioning unit 220 can power a plurality of actuators 224, such as one or more of a low pressure compressor bleed valve actuator 226, a low pressure compressor vane actuator 228, a high pressure compressor vane actuator 230, an active clearance control actuator 232, and other such effectors. In some embodiments, the low pressure compressor vane actuator 228 and/or the high pressure compressor vane actuator 230 can be omitted where active control of stator vanes 45, 55 of FIG. 1 is not needed. Collectively, any effectors that can change a state of the gas turbine engine 120 and/or the electrical power system 210 may be referred to as hybrid electric system control effectors 240. Examples of the hybrid electric system control effectors 240 can include the electric motors 212A, 212B, electric generators 213A, 213B, integrated fuel control unit 222, actuators 224 and/or other elements (not depicted).

In one non-limiting embodiment and through electrical boost provided to the high speed spool 32 and/or the low speed spool 30 variable vane actuators of the high speed spool 32 and/or the low speed spool 30 may be reduced and/or eliminated as the need for variable vanes may be reduced or eliminated.

Figure 3:
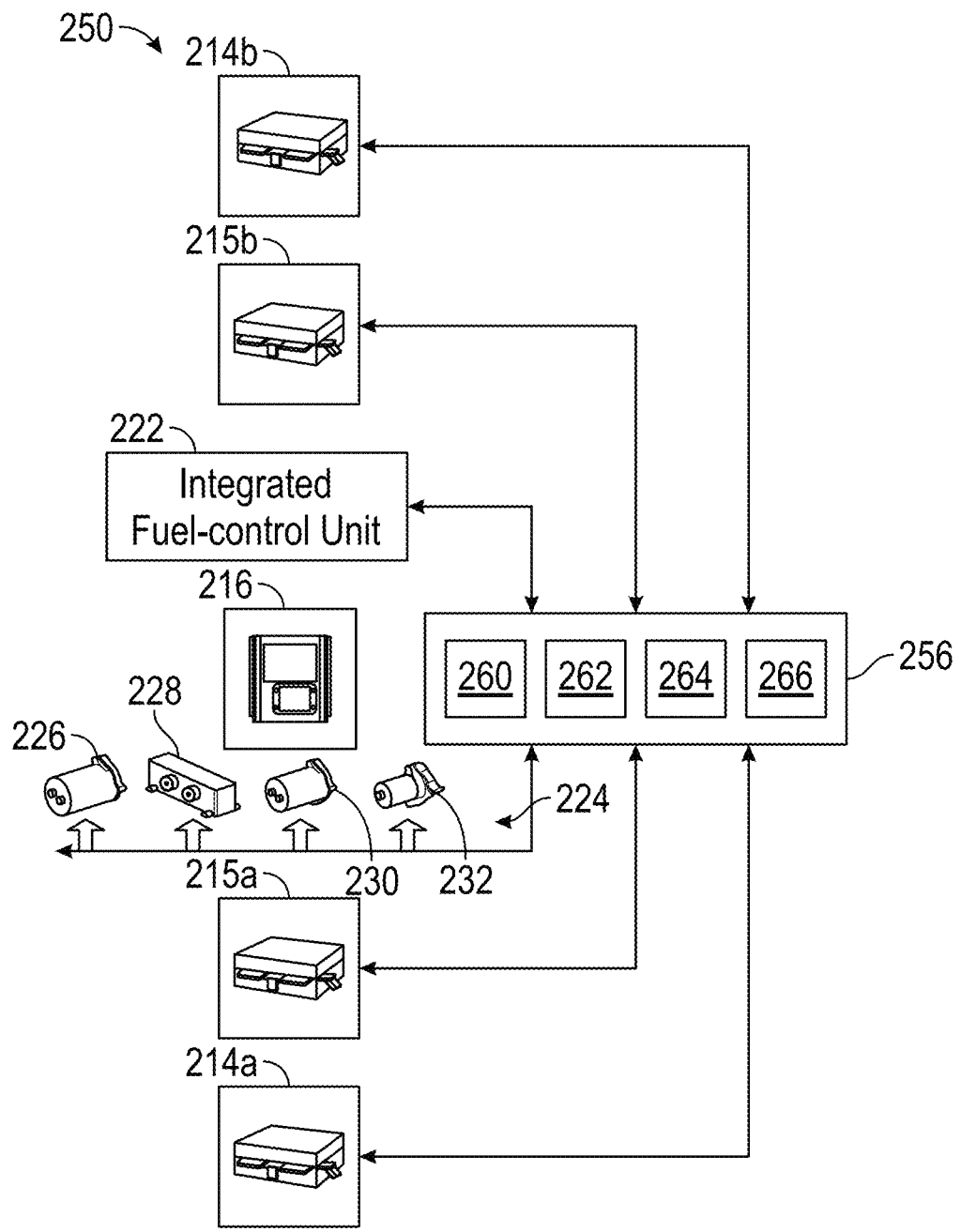
FIG. 3 is a schematic diagram of control signal paths of a hybrid electric propulsion system, in accordance with an embodiment of the disclosure.

FIG. 3 is a schematic diagram of control signal paths 250 of the hybrid electric propulsion system 100 of FIG. 2 and is described with continued reference to FIGS. 1 and 2. A controller 256 can interface with the motor drive electronics 214A, 214B, rectifier electronics 215A, 215B, energy storage management system 216, integrated fuel control unit 222, actuators 224, and/or other components (not depicted) of the hybrid electric propulsion system 100. In embodiments, the controller 256 can control and monitor for fault conditions of the gas turbine engine 120 and/or the electrical power system 210. For example, the controller 256 can be integrally formed or otherwise in communication with a full authority digital engine control (FADEC) of the gas turbine engine 120. In embodiments, the controller 256 can include a processing system 260, a memory system 262, and an input/output interface 264. The controller 256 can also include various operational controls, such as a power transfer control 266 that controls the hybrid electric system control effectors 240 as further described herein.

The processing system 260 can include any type or combination of central processing unit (CPU), including one or more of: a microprocessor, a digital signal processor (DSP), a microcontroller, an application specific integrated circuit (ASIC), a field programmable gate array (FPGA), or the like. The memory system 262 can store data and instructions that are executed by the processing system 260. In embodiments, the memory system 262 may include random access memory (RAM), read only memory (ROM), or other electronic, optical, magnetic, or any other computer readable medium onto which is stored data and algorithms in a non-transitory form. The input/output interface 264 is configured to collect sensor data from the one or more system sensors and interface with various components and subsystems, such as components of the motor drive electronics 214A, 214B, rectifier electronics 215A, 215B, energy storage management system 216, integrated fuel control unit 222, actuators 224, and/or other components (not depicted) of the hybrid electric propulsion system 100. The controller 256 provides a means for controlling the hybrid electric system control effectors 240 based on a power transfer control 266 that is dynamically updated during operation of the hybrid electric propulsion system 100. The means for controlling the hybrid electric system control effectors 240 can be otherwise subdivided, distributed, or combined with other control elements.

The power transfer control 266 can apply control laws and access/update models to determine how to control and transfer power to and from the hybrid electric system control effectors 240. For example, sensed and/or derived parameters related to speed, flow rate, pressure ratios, temperature, thrust, and the like can be used to establish operational schedules and transition limits to maintain efficient operation of the gas turbine engine 120.

Figure 4:
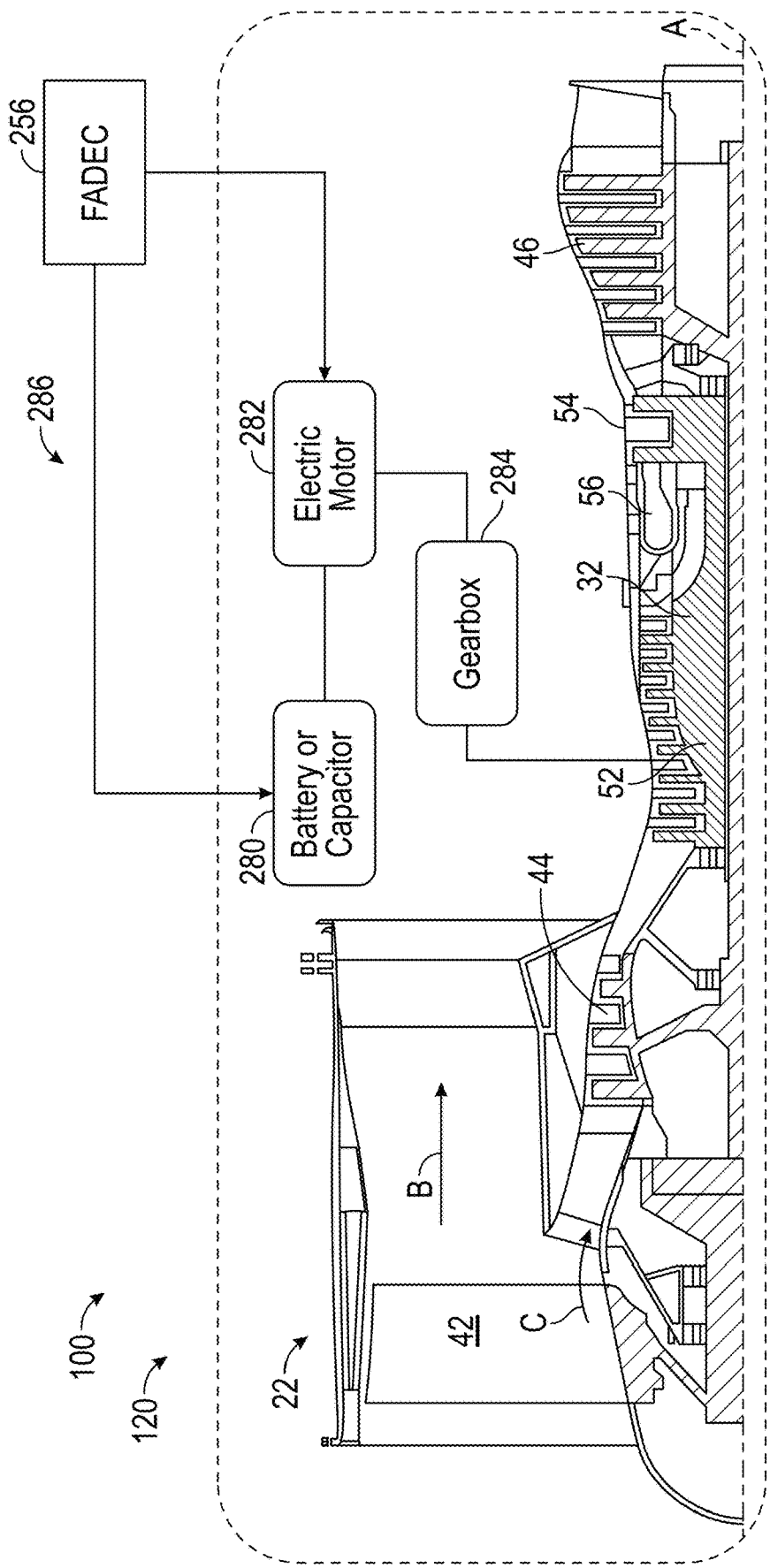
FIG. 4 is a partial cross-sectional illustration of a gas turbine engine, with electric power assist for in-flight engine re-start in accordance with an embodiment of the disclosure.

Referring now to FIG. 4, a hybrid electric propulsion system 100 (also referred to as hybrid gas turbine engine 100) including a gas turbine engine 120 operably coupled to an electrical power system 210 as part of a hybrid electric aircraft in accordance with one non-limiting embodiment of the present disclosure is illustrated, In this embodiment, the engine 120 has a power source 280 such as a battery, a super capacitor, an ultra capacitor or an equivalent thereof, which supplies power to a motor 282, which is connected to an engine accessory gearbox 284 that is operably coupled to the high speed spool 32 such that the motor 282, when operated will provide power assist to the high speed spool 32 via the accessory gearbox 284. In other words, the accessory gearbox will have at least one component (e.g., a gear train or other equivalent device) operably coupled to the high speed spool 32 and the motor 282 such that operation of the motor 282 will rotate the component which in turn will rotate the high speed spool 32. The power assist to the high speed spool 32 via the motor 282 will add enough stability to the high pressure compressor in order to allow re-starting without external power assist which may be provided by an auxiliary power unit (APU) or from an opposite engine (e.g., cross-bleed start).

In one non-limiting embodiment, motor 282 may be motor 212B of the embodiment illustrated in FIG. 2, which is configured to provide power assist to the high speed spool 32. Alternatively, motor 282 may be part of a different configuration or system configured to only provide power assist to the high speed spool 32 in order to expand an in-flight re-start envelope.

In an alternative embodiment, motor 282 may be operatively coupled to the low speed spool 30 via accessory gearbox 284 in order to provide additional thrust to the engine 20.

The system may be referred to a power assist system 286 that limits or avoids pilot or aircraft control intervention during an in-flight engine start process or re-start, in a "windmill" envelope where external power source such as APU or opposite engine power assist is not available or prohibited. In this "windmill" envelope the engine re-start may be autonomous (e.g., without pilot or aircraft control intervention) and the full authority digital engine control (FADEC) controls the power source and the engine. In one embodiment, the engine re-start is autonomous (e.g., without pilot or aircraft control intervention) and the full authority digital engine control (FADEC) controls the power source and the engine. As such and in one embodiment, the power source 280 and the motor 282 of the power assist system 286 is under the full authority of the FADEC.

In one embodiment and as mentioned above, the controller 256 can control and monitor for fault conditions of the gas turbine engine 120 and/or the electrical power system 210. For example, the controller 256 can include a processing system 260, a memory system 262, and an input/output interface 264.

The input/output interface 264 is configured to collect sensor data from the one or more system sensors and interface with various components and subsystems, such as components of the motor drive electronics 214A, 214B, rectifier electronics 215A, 215B, energy storage management system 216, integrated fuel control unit 222, actuators 224, and/or other components (not depicted) of the hybrid electric propulsion system 100. Thus, the controller 256 provides a means for controlling the hybrid electric system control effectors 240 based on a power transfer control 266 that is dynamically updated during operation of the hybrid electric propulsion system 100. The means for controlling the hybrid electric system control effectors 240 can be otherwise subdivided, distributed, or combined with other control elements.

The power transfer control 266 can apply control laws and access/update models to determine how to control and transfer power to and from the hybrid electric system control effectors 240. For example, sensed and/or derived parameters related to speed, flow rate, pressure ratios, temperature, thrust, and the like can be used to establish operational schedules and transition limits to maintain efficient operation of the gas turbine engine 120. As such, the controller 256 is capable of determining an in-flight windmill re-start condition of the engine 120 by sensing the aforementioned parameters related to speed, flow rate, pressure ratios, temperature, thrust, fuel flow and the like. Once, the controller determines that the engine 120 is in an in-flight windmill re-start condition or "windmill" envelope the controller 256 causes power to be supplied from a power source 280 to the electric motor 282 in order to augment rotational power of the high speed spool 32 or the low speed spool 30 during the detected in-flight windmill re-start condition.

Figure 5:
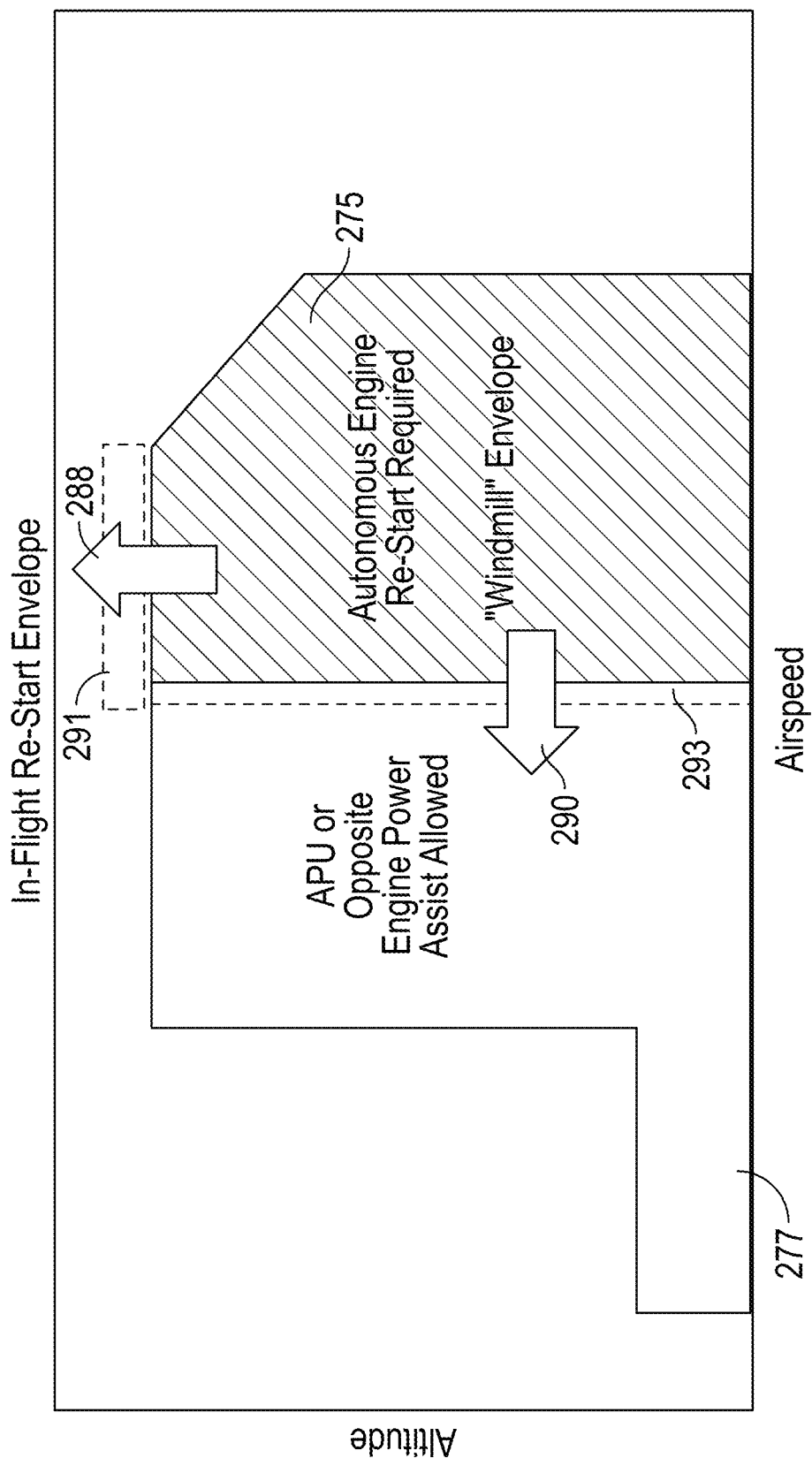
FIG. 5 is a plot of altitude vs. airspeed for an in-flight re-start envelope.

This "windmill" envelope is illustrated by the cross-hatched region in FIG. 5, which shows the envelope where autonomous re-start is preferred or required. This region being referred to as an autonomous windmill envelope or re-start envelope 275, which is identified by arrow 275. FIG. 5 being a plot of altitude vs. airspeed for an in-flight re-start envelope. The unshaded area 277 may be referred to a region (altitude vs. airspeed) where auxiliary power unit (APU) or opposite engine power assist is available or allowed.

By employing a power source 280 such as a battery, a super capacitor, an ultra capacitor or an equivalent thereof and motor 282, and controller 256, additional power is added to the high spool 32 of the engine 120 to provide an in-flight re-start in the autonomous windmill envelope. As such, the autonomous windmill re-start envelope is expanded in the directions of arrows 288 and 290. This expanded boundary is illustrated by the grey areas 291 and 293 illustrated with the dotted line boundary in FIG. 5. The grey regions 291 and 293 with the dotted line boundary, shows that the re-start envelope 275 is expanded by internal battery and/or capacitor power assist.

As such, the following non-limiting benefits are derived from various embodiments of the present disclosure: improved re-start reliability for required windmill envelope; improved rotor lock avoidance within required envelope; allows envelope expansion to the same re-start time; and allows envelope expansion to the same operability constraints, such as compressor stability and burner light-ability.

In one embodiment and to maintain operational stability of the compressor section 24 of the engine 120 during in-flight engine re-start, the controller 256 or (FADEC) of the gas turbine engine 120 will be configured to add enough power to the high speed spool 32 via motor 282 to provide compressor stability to the high pressure compressor 52 such that high pressure compressor bleed valves or are no longer needed.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A hybrid electric propulsion system comprising:
a gas turbine engine comprising a low speed spool and a high speed spool, the low speed spool comprising a low pressure compressor and a low pressure turbine, and the high speed spool comprising a high pressure compressor and a high pressure turbine;
an electric motor configured to augment rotational power of the high speed spool or the low speed spool; and
a controller programmed to:
determine, based at least in part on an altitude and airspeed associated with the hybrid electric propulsion system, that an opposite engine power assist is prohibited;
detect an in-flight windmill re-start condition of the gas turbine engine, wherein the in-flight windmill re-start condition of the gas turbine engine is based at least in part on a determination that opposite engine power assist is prohibited; and
cause power to be supplied from a power source to the electric motor in order to augment rotational power of the high speed spool or the low speed spool during the detected in-flight windmill re-start condition, the controller and the electric motor providing compressor stability to the high pressure compressor during the detected in-flight windmill re-start condition without the use of high pressure compressor bleed valves, wherein the in-flight windmill re-start condition includes altitudes that are higher than those used for an in-flight windmill re-start condition where no augmentation is provided to the high speed spool or the low speed spool and the in-flight windmill re-start condition includes airspeeds that are lower than those used for the in-flight windmill re-start condition where no augmentation is provided to the high speed spool or the low speed spool.

2. The hybrid electric propulsion system as in claim 1, wherein the controller is a full authority digital engine control (FADEC).

3. The hybrid electric propulsion system as in claim 1, wherein the controller is a full authority digital engine control (FADEC) and the power source and the electric motor are under the full authority of the full authority digital engine control (FADEC).

4. The hybrid electric propulsion system as in claim 3, wherein the motor is connected to an engine accessory gearbox that is operably coupled to the high speed spool.

5. The hybrid electric propulsion system as in claim 4, wherein the motor is configured to only augment rotational power of the high speed spool during the detected in-flight windmill re-start condition of the gas turbine engine.

6. The hybrid electric propulsion system as in claim 1, wherein the power source is at least one of the following: a battery; a super capacitor; and an ultra capacitor.

7. The hybrid electric propulsion system as in claim 1, wherein the motor is connected to an engine accessory gearbox that is operably coupled to the high speed spool.

8. The hybrid electric propulsion system as in claim 1, wherein the motor is configured to only augment rotational power of the high speed spool during the detected in-flight windmill re-start condition of the gas turbine engine.

9. A method for stabilizing a compressor section of a gas turbine engine of a hybrid electric propulsion system during an in-flight re-start of the gas turbine engine, comprising:
   determine, based at least in part on an altitude and airspeed associated with the hybrid electric propulsion system, that an opposite engine power assist is prohibited;
   detecting by a controller an in-flight windmill re-start condition of the gas turbine engine, wherein the in-flight windmill re-start condition of the gas turbine engine is based at least in part on a determination that opposite engine power assist is prohibited; and
   providing power assist to a high speed spool of the gas turbine engine via an electric motor operably coupled to the high speed spool during the in-flight re-start of the gas turbine engine, the controller and the electric motor providing compressor stability to a high pressure compressor of the high speed spool during the in-flight re-start without the use of high pressure compressor bleed valves of the gas turbine engine, wherein the in-flight windmill re-start condition includes altitudes that are higher than those used for an in-flight windmill re-start condition where no augmentation is provided to the high speed spool or a low speed spool of the gas turbine engine and the in-flight windmill re-start condition includes airspeeds that are lower than those used for the in-flight windmill re-start condition where no augmentation is provided to the high speed spool or the low speed spool.

10. The method as in claim 9, wherein the in-flight re-start of the gas turbine engine is autonomous.

11. The method as in claim 9, further comprising:
   supplying power from a power source to the electric motor, wherein a full authority digital engine control (FADEC) is provided and the power source and the electric motor are under the full authority of the full authority digital engine control (FADEC).

12. The method as in claim 11, wherein the controller is a full authority digital engine control (FADEC).

13. The method as in claim 11, wherein the power source is at least one of the following: a battery; a super capacitor; and an ultra capacitor.

14. The method as in claim 11, wherein the in-flight re-start of the gas turbine engine is autonomous.

15. The method as in claim 14, wherein the controller is a full authority digital engine control (FADEC).

* * * * *